J. L. COLLINS & H. C. BURGIE.

Stove-Drums.

No. 5,812. Reissued March 31, 1874.

WITNESSES:
P. C. Dieterich.
C. H. Watson

INVENTORS.
James L. Collins
Henry C. Burgie
per. West & Bond
ATTORNEYS.

AM. PHOTO-LITHOGRAPHIC Co. N.Y. (OSBORNE'S PROCESS.)

UNITED STATES PATENT OFFICE

JAMES L. COLLINS AND HENRY C. BURGIE, OF CHICAGO, ILLINOIS.

IMPROVEMENT IN STOVE-DRUMS.

Specification forming part of Letters Patent No. 70,168, dated October 29, 1867; reissue No. 5,812, dated March 31, 1874; application filed March 17, 1874.

*To all whom it may concern:*

Be it known that we, JAMES L. COLLINS and HENRY C. BURGIE, both of Chicago, Illinois, have made certain new and useful Improvements in Stove-Drums; and we do hereby declare that the following is a full, clear, and exact description thereof, reference being had to the accompanying drawings, making a part of this specification, in which—

Figure 1:
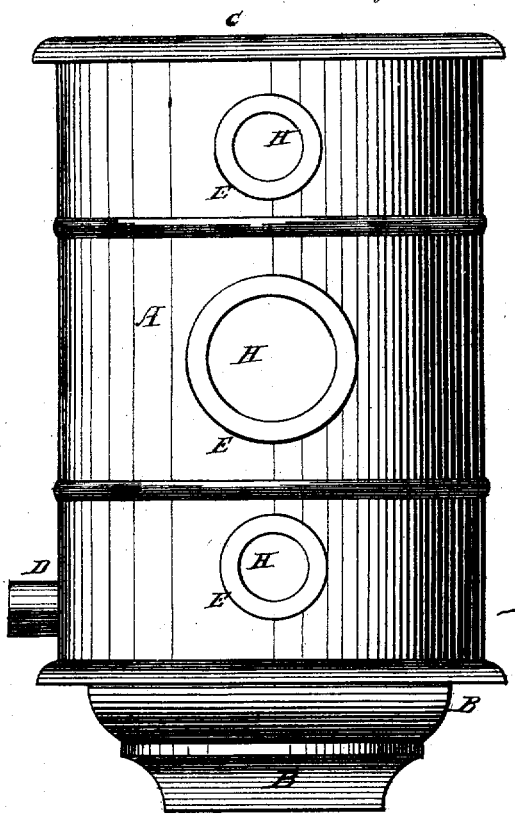
Figure 2:
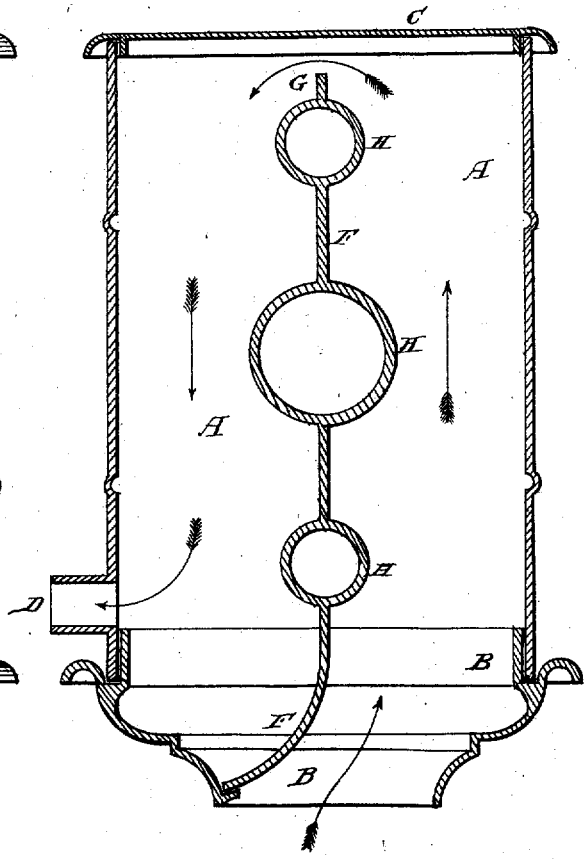
Figure 3:
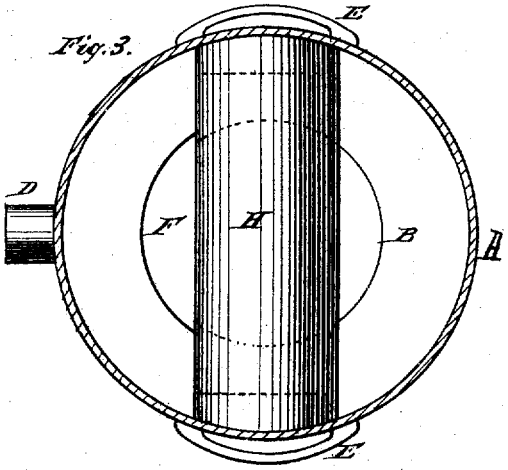
Figure 4:
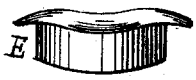
Figure 5:
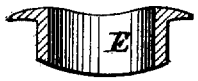

Figure 1 is a side elevation; Fig. 2, a vertical section; Fig. 3, a top view with the cover removed; Fig. 4, the collars E; Fig. 5, a vertical section of one of the collars.

The object of our invention is to increase the heating capacity of the drums of ordinary stoves of that class in which the drum is placed directly over the stove; and it consists in providing such stove-drum with a partition so constructed that the heated products of combustion must pass first to the top of the drum and back to the bottom of the drum before entering the pipe; in providing such drum with one or more air-tubes passing through the same, the tubes forming a part of the partition when used; and in making the partition reversible.

In the drawings, A represents the body of the drum, of any suitable size. It can most conveniently be cylindrical. B represents the top of the stove with which the drum is to be used. This part B is open, so that the heat and gases pass directly from the stove into the drum A, as shown in Fig. 2. C is the top of the drum. It may be made either of sheet-iron or cast-iron, and may be made removable to facilitate the cleaning of the drum.

F is a partition in the drum. As represented it is composed of a plate or sheet of metal and tubes H, all connected together. This partition is curved or bent at the bottom, so as to closely fit the inside of B, and prevent the direct passage of the hot air and smoke into the smoke-pipe D. Its width is such that it fits the interior of the drum, and its length is such as to leave only a few inches of space between it and the top of the drum. When the tubes H are used, openings are made in each side of the drum corresponding in size with these tubes or air-passages, and so located that when the partition and tubes are in place the tubes will be exactly opposite the openings. E are collars fitting into the tubes H, serving the purpose of holding the partition and tubes in place, and connecting the tubes with the wall of the drum. The bottom of the partition may rest on a ledge, *c*, cast in B. The collars may be secured to the drum. The partition F may be made of a single plate or sheet of metal, without any tubes, in which case the openings in the sides of the drum must not be made and the collars will not be required. When made as represented the partition and tubes are only attached to the drum by means of the collars E, so that by properly locating the tubes and openings in the drum the partition can be readily reversed, if desired, (when the drum is not required as a heater,) allowing the products of combustion to pass directly from the stove into the smoke-pipe D.

In use, when the partition is arranged as represented, the smoke and heat from the fire first pass through the top B of the stove directly into the front part of the drum, the lower end of the partition being so arranged as to prevent their direct passage into the smoke-pipe; then they must pass to the top of the drum and over the top of the partition F at G; then they must descend in the back part of the drum to the smoke-pipe D, which is located as near the bottom of the drum as possible; and, as heated air and gases descend slowly, the greater portion of the heat will be radiated into the room, and but a small portion will escape through the pipe.

When the tubes are used the heating capacity will be increased, as currents of air will constantly pass through the tubes and become heated.

What we claim as new is as follows:

1. The herein-described stove-drum, consisting of the case A, top C, partition F, and smoke-outlet D, in combination with part B, substantially as and for the purpose specified.

2. The reversible partition F, provided with lateral flues and bent at the lower end to close part of the opening into the drum, substantially as specified.

3. The combination of the case A, partition F, tubes H, and collars E, substantially as specified.

JAMES L. COLLINS.
HENRY C. BURGIE.

Witnesses:
E. A. WEST,
O. W. BOND.